(12) United States Patent
Thompson et al.

(10) Patent No.: US 8,630,815 B2
(45) Date of Patent: Jan. 14, 2014

(54) DIGITAL NETWORK QUALITY CONTROL SYSTEM UTILIZING FEEDBACK CONTROLLED FLEXIBLE WAVEFORM SHAPE FOR THE CARRIER SIGNAL

(75) Inventors: Edward D. Thompson, Casselberry, FL (US); David Bateman, Geneva, FL (US); Matt Bush, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 810 days.

(21) Appl. No.: 12/489,727

(22) Filed: Jun. 23, 2009

(65) Prior Publication Data

US 2010/0325475 A1     Dec. 23, 2010

(51) Int. Cl.
*G01R 13/00*     (2006.01)

(52) U.S. Cl.
USPC ............................................. 702/66

(58) Field of Classification Search
USPC ............................................. 702/66
See application file for complete search history.

(56) References Cited

U.S. PATENT DOCUMENTS

| | | | |
|---|---|---|---|
| 5,107,520 A | 4/1992 | Karam et al. | |
| 5,265,151 A * | 11/1993 | Goldstein | 379/93.32 |
| 6,134,589 A | 10/2000 | Hultgren | |
| 6,990,294 B2 | 1/2006 | Ikoma et al. | |
| 7,406,052 B2 | 7/2008 | Suciu et al. | |
| 7,502,594 B2 | 3/2009 | Ginggen et al. | |
| 2004/0057725 A1 * | 3/2004 | Lee et al. | 398/24 |
| 2009/0076751 A1 | 3/2009 | Li et al. | |

* cited by examiner

*Primary Examiner* — Stephen Cherry

(57) ABSTRACT

A digital network quality control system and method utilizing feedback controlled flexible waveform shape for the carrier signal is provided. The system and method provides self-analysis and feedback to a variable waveform to increase network reliability and speed by modifying the shape of the waveform itself based on a self analysis of the waveform.

10 Claims, 4 Drawing Sheets

DIGITAL NETWORK QUALITY CONTROL SYSTEM UTILIZING FEEDBACK CONTROLLED FLEXIBLE WAVEFORM SHAPE FOR THE CARRIER SIGNAL

FIELD OF THE INVENTION

This invention relates to digital communications and more particularly to a digital network quality control system and method utilizing feedback controlled flexible waveform shape for the carrier signal.

BACKGROUND OF THE INVENTION

Data may be transmitted between different devices in a communication system through a "data link". The component that generates and transmits a signal through the data link may be referred to as a "transmitter"; whereas, the component that receives the signal over the data link and extracts information from the signal may be referred to as a "receiver." In communications, modulation is the process of varying a periodic waveform in order to use that signal to convey a message. The electronic waveform is the key to transmitting information in both analog and digital communications networks. Amplitude modulation (AM) is a technique used in electronic communications, most commonly for transmitting information via a radio carrier wave. AM works by varying the strength/amplitude of the transmitted signal in relation to the information being sent. Frequency modulation (FM) conveys information over a carrier wave by varying its frequency.

Digital communications use a rapidly changing voltage waveform to signify the stream of ones and zeros that make up the transfer of digital information. The voltage is measured at various time intervals to to determine if a data bit is a "1" or a "0". Distortion of the waveform can prevent the data bit from being properly interpreted and cause an error that must be corrected through error checking and retransmission of information. Ringing and distortion of the waveform signal can be caused by capacitance and inductance due to cabling length, properties of the cable, the number and configuration of cabling runs, and electromagnetic interference (EMI) from other sources.

Traditional digital communications use an electrical signal of varying voltage with a certain frequency (the carrier frequency) to transmit information. Certain features of the waveform will determine if the segment of the waveform is transmitting data meant to be interpreted as a "1" or a "0". The integrity of a digital network is based on how closely the waveform adheres to the criteria and tolerances required to interpret the zeros and ones based on the rapidly changing voltage levels.

The waveform may be amplitude or frequency modulated to transmit the information, but the base frequency and ideal waveform shape are typically constant for the 1's and 0's that flow on the communications bus. Many of these communications networks use a packet transfer methodology, where packets of data are error checked and re-transmitted if there is any corruption detected. The problem with this technique is that if the waveform is badly corrupted then a packet may not be capable of transmission at all, or it could require a great number of transmissions of a packet before it is received in an uncorrupted state.

Waveform corruption can be caused by capacitive and inductive effects of the cable itself, as well as electromagnetic interference (EMI) caused by nearly electronics, power cables, or other equipment that can produce EMI.

The current state of the art deals with the problem of waveform corruption by placing limits on the cable lengths thus controlling the amount of capacitance and inductance in the cable and keeping the waveform within a certain specified shape.

A number of digital network quality control systems exist such as those described in U.S. Pat. Nos. 5,107,520, 6,990,294, 6,134,589, 7,406,052, 7,502,594, 20090076751, all of which are incorporated herein by reference.

SUMMARY OF THE INVENTION

Broadly speaking, the invention provides a digital network quality control system and method utilizing feedback controlled flexible waveform shape for the carrier signal. The present invention provides self-analysis and feedback to a variable waveform to increase network reliability and speed by modifying the shape of the waveform itself based on a self analysis of the waveform. With the method and system herein, the communications bus hardware continually analyzes and tunes the waveform it creates, for optimum data transfer rate and reliability, allowing longer wire lengths and increased tolerance of EMI.

In an embodiment of the present invention, electronics capture the waveform and a microprocessor analyzes critical features of the waveform to determine how close the features are to data transfer acceptance criteria. The microprocessor then feeds back new waveform criteria such as pulse width, voltage levels, or carrier frequency, to the waveform generator that produces the data bus waveform. The waveform is generated to provide clean data transmittal under the actual conditions being seen at that moment.

The invention can be implemented in numerous ways, including as a system, a device/apparatus, a method, or a computer readable medium. Several embodiments of the invention are discussed below.

As a method, the invention comprises a computer-implemented method for digital network quality control, comprising: capturing a waveform from a data bus via a waveform capture device; analyzing via a computing device the captured waveform by comparing the captured waveform to predetermined data transfer acceptance criteria for a clean waveform to determine if the captured waveform meets the data transfer acceptance criteria for a clean waveform wherein if the waveform does not meet the data transfer acceptance criteria for a clean waveform, compiling factors to modify the waveform in order to meet the criteria (or new criteria based on the waveform); and sending the factors back to a waveform generator to control the waveform generator by modifying the waveform on the data bus. The factors comprise one or more of adjustments to pulse width, voltage levels, or carrier frequency for the waveform. The predetermined data transfer acceptance criteria and/or the captured waveform are stored in memory associated with the computing device. The method may be activated periodically or in accordance with an error rate determination for data transmitted on the data bus. The data bus may be binary or correspond to any base "n" network.

The methods of the present invention may be implemented as a computer program product with a computer-readable medium having code thereon.

As an apparatus, the present invention may include a waveform capture device, at least one processor, a memory coupled to the processor, and a program residing in the memory which implements the methods of the present invention.

Using this method, distortion or interference of the voltage signal are compensated to allow the signal to be read whereas the traditional non-flexible waveform communication signal may never be clean enough to transmit even a single packet. Also, the flexible waveform of the present invention would be more capable of transmitting packets at a very low error rate resulting in a higher data transfer rate, whereas non-flexible waveform communications may require frequent packet re-transmissions, resulting in a very slow data transfer rate.

Accordingly, an advantage of the present invention is that it increases network reliability and speed, as compared to traditional networks that use a waveform with fixed frequency and feature criteria. It also provides optimum data transfer rate and reliability, allowing longer wire lengths and increased tolerance of EMI. Thus, the flexible waveform of the present invention will insure the highest data transfer rate possible for any length or type of cable, in any EMI environment, and will allow greater cable lengths than traditional technology.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Broadly speaking, the invention provides a digital network quality control system and method utilizing feedback controlled flexible waveform shape for the carrier signal. The present invention provides self-analysis and feedback to a variable waveform to increase network reliability and speed by modifying the shape of the waveform itself based on a self analysis of the waveform. With the method and system herein, the communications bus hardware continually analyzes and tunes the waveform it creates, for optimum data transfer rate and reliability, allowing longer wire lengths and increased tolerance of EMI.

Figure 1:
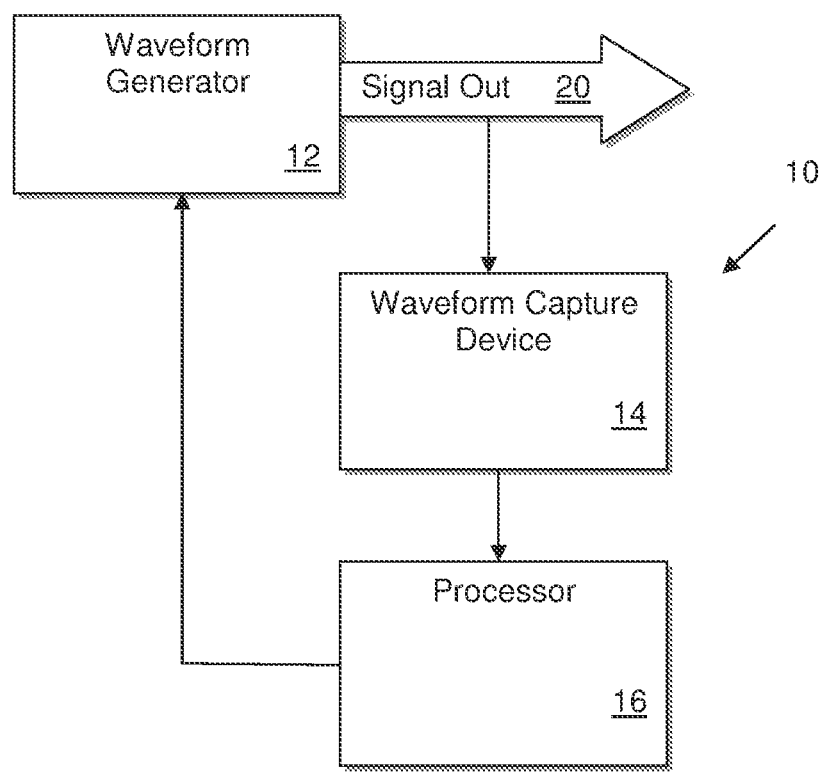
FIG. 1 is a block diagram of an embodiment of the invention.

Turning to FIG. 1, in an embodiment of the present invention, a waveform capture device 14, such as a digital storage oscilloscope (DSO) or any other test device that can capture signal waveforms, captures the waveform. A computing device 16 (e.g., microprocessor, circuit board, etc.) in communication with the waveform capture device 14 analyzes critical features of the waveform to determine how close the features are to a predetermined data transfer acceptance criteria. The computing device 16 may comprise one or more processors, and is configured for controlling the waveform capture device 14 to capture signal waveforms from the bus or other communication link on which a signal travels and for receiving the signal waveforms from the waveform capture device 14. Furthermore, the computing device 16 is configured for analyzing the captured waveforms in accordance with a user's preference such as to determine how close the features are to predetermined data transfer acceptance criteria. A storage device may be provided that communicates with the computing device 16, and is configured for storing the data transfer acceptance criteria as well as pulse width, voltage levels, or carrier frequency adjustments to produce desired/clean waveforms.

The computing device 16 may be further configured to output a result to a display device. The display device is configured for displaying a result of an analysis of the waveforms. The display device may comprise one or more displays arranged in various positions to display the result of the waveform analysis.

The computing device 16 then feeds back new waveform criteria such as pulse width, voltage levels, or carrier frequency, to the waveform generator 12 that produces the data bus waveform (signal out 20). The waveform is generated to provide clean data transmittal under the actual conditions being seen at that moment.

Figure 2:
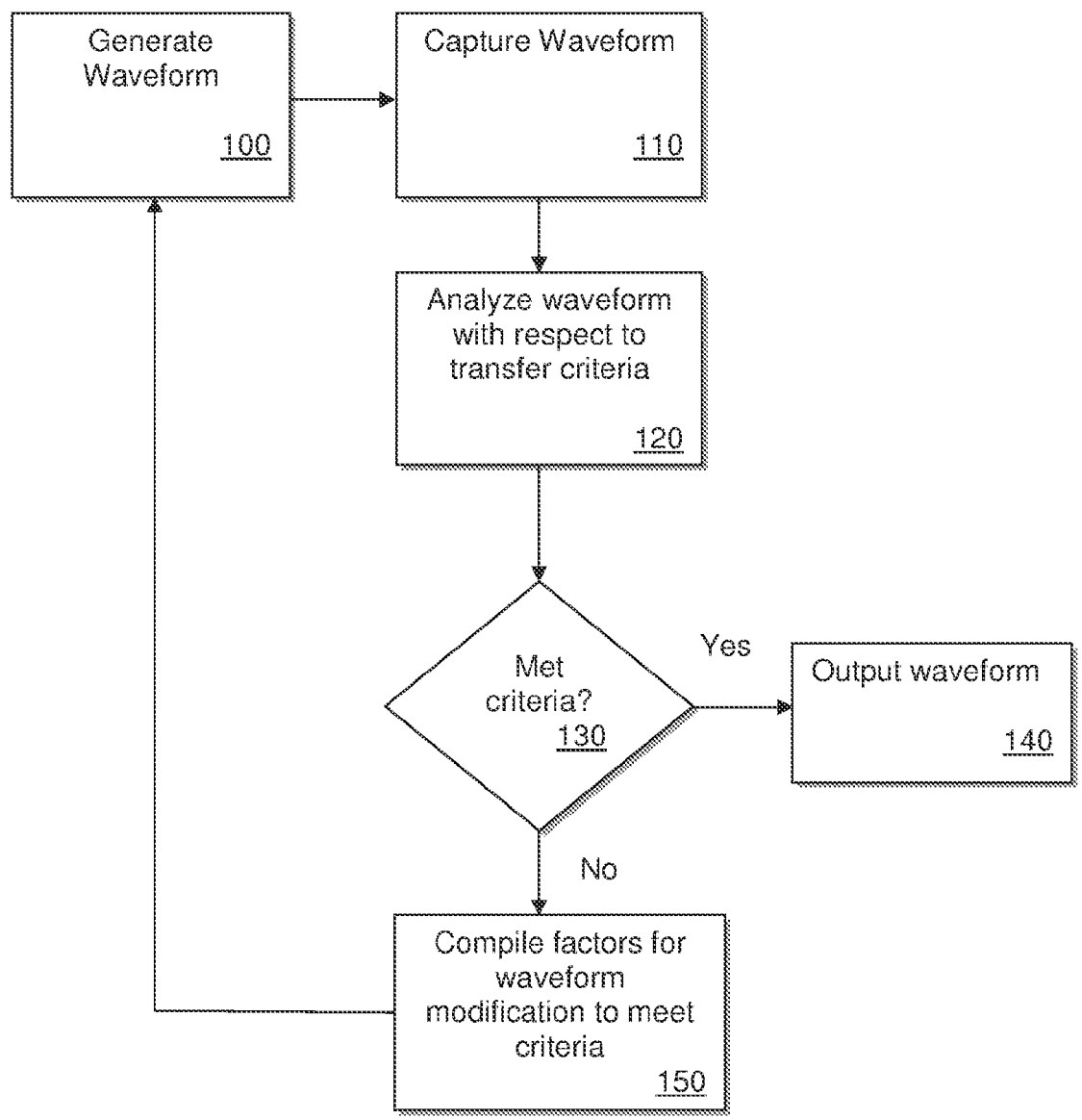
FIG. 2 is a flow chart showing the steps of an embodiment of the invention.

Turning now to FIG. 2, a flowchart shows an embodiment of the invention of computer-based method for digital network quality control. Signal data is generated by a waveform generator on a data bus in step 100. The signal waveform is then captured via a waveform capture device in step 110. A computing device analyzes the captured waveform in step 120. The computing device compares the captured waveform to predetermined data transfer acceptance criteria for a clean waveform to determine if the captured waveform meets the criteria according to the data transfer acceptance criteria for a clean waveform in step 130. If the waveform is determined to be a clean waveform, no adjustments are made to the waveform output in step 140. Otherwise, if the waveform does not meet the data transfer acceptance criteria for a clean waveform, factors are compiled to modify the waveform in order to meet the criteria (such as adjustments to pulse width, voltage levels, or carrier frequency) in step 150 which are then sent back to the waveform generator to modify the waveform in accordance thereto.

This self analysis and redesign can automatically be done either periodically or if the data transfer error rate exceeds acceptable values. Thus, the waveform capture device can be programmed to capture the signal waveforms according to a predetermined interval. Or, the waveform capture device can be programmed to capture the signal waveforms according to a error rate determination where the error rate for the waveform data is first analyzed and compared to a predetermined acceptable error rate and when the error rate exceeds a predetermined rate, the method is instituted. Once the error rate drops below a predetermined level, the method may halt.

The methods can also be applied to digital networks utilizing other than a binary format. For instance, based on voltage at appropriate parts of the carrier cycle, there might be 3 or more (generically "n") potential voltages which would correspond to a base "n" network.

The system may comprise one or more modules to carry out the functions of the invention. Accordingly, the system may include a data transfer acceptance criteria receiving module configured for receiving one or more data transfer acceptance criteria; a waveform receiving module configured for receiving the signal waveform; a waveform analysis module configured for analyzing the signal waveform as compared to a clean waveform determining factors necessary to modify the waveform to meet the criteria; and a waveform generator control module for sending control factors to the waveform generator to modify the waveform. The system may further include a data storing module configured for storing the data transfer acceptance criteria and the factors necessary to modify the waveform to meet the criteria into a storage device. The system may further include an error detection module for detecting an error rate in the data and activating the self analysis and redesign of the invention when a predetermined threshold is met. Alternately, the system may include a timing module for periodically activating the self analysis and redesign of the invention. Moreover, an outputting module may be provided for outputting a result of the analysis.

A computer-readable medium having stored thereon instructions for digital network quality control, when executed by a computer, is also provided. The instructions cause the computer to: capture a waveform via a waveform capture device; analyze via a computing device the captured waveform; comparing the captured waveform to predetermined data transfer acceptance criteria for a clean waveform to determine if the captured waveform meets the criteria according to the data transfer acceptance criteria for a clean waveform where if the waveform is determined to be a clean waveform, no adjustments are made to the waveform output, otherwise, if the waveform does not meet the data transfer acceptance criteria for a clean waveform, compiling factors to modify the waveform in order to meet the criteria (such as adjustments to pulse width, voltage levels, or carrier frequency), and sending the factors back to the waveform generator to modify the waveform in accordance thereto.

Figure 3:
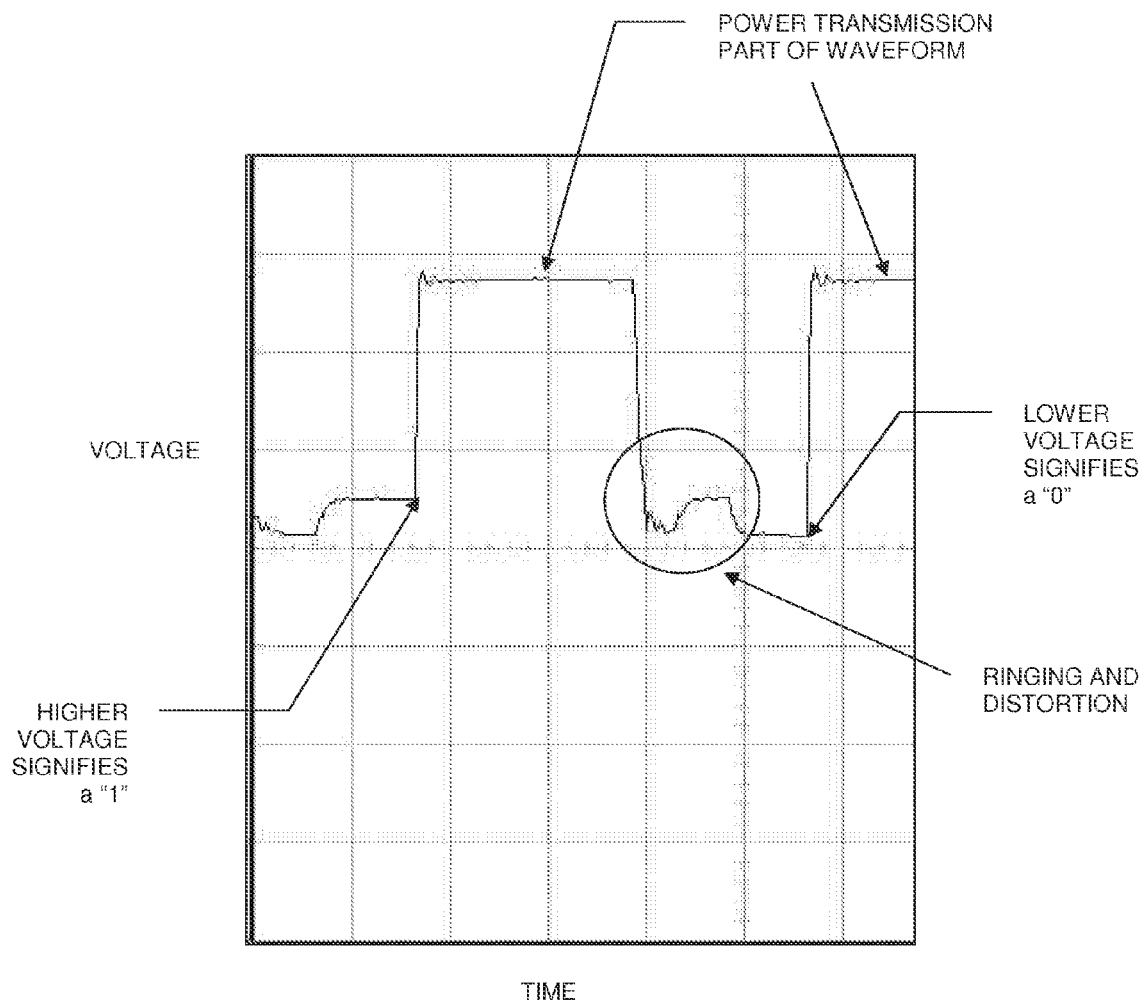
FIG. 3 is a graph of a clean waveform in an amplitude modulated communication.
Figure 4:
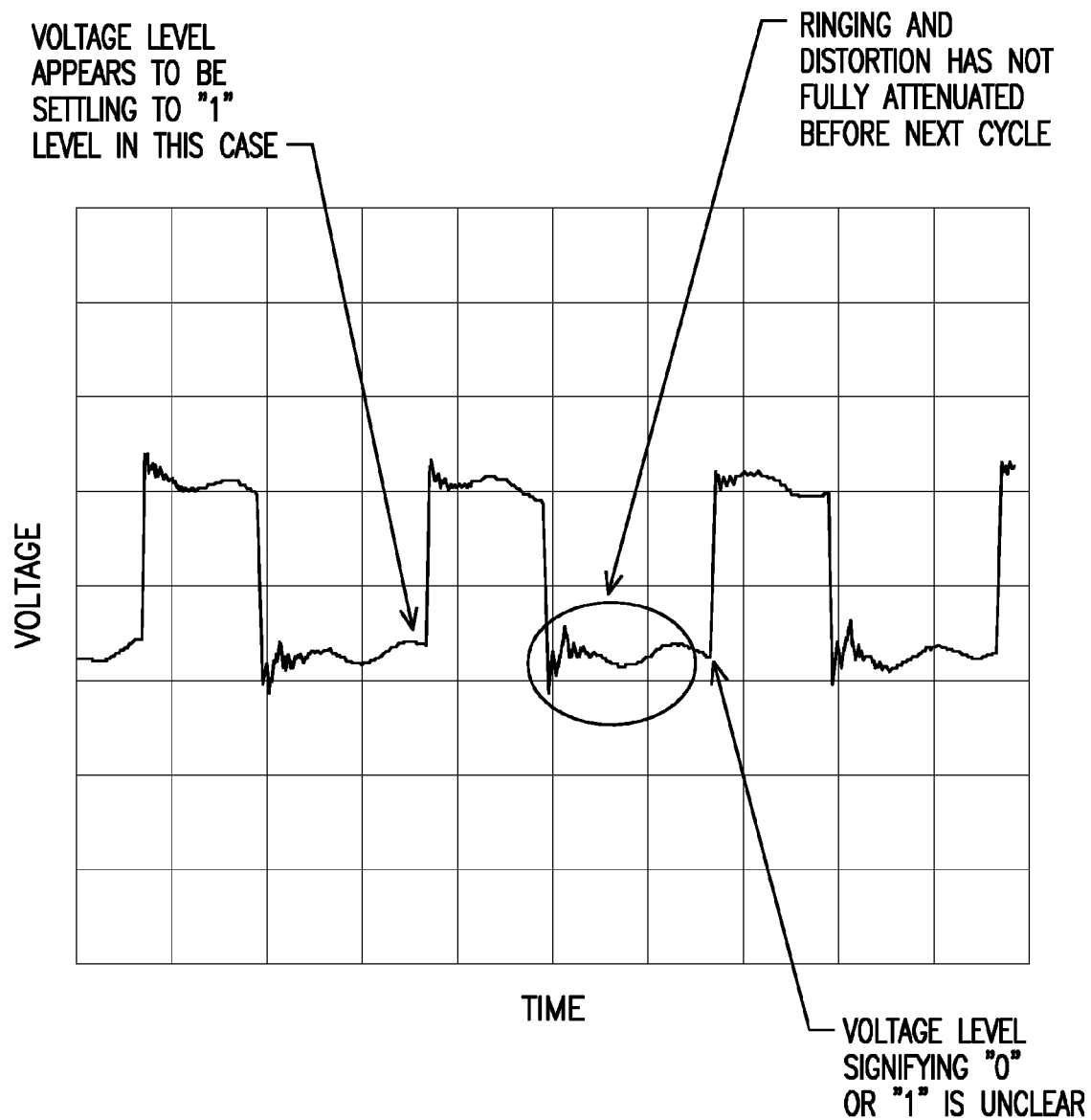
FIG. 4 is a graph of a distorted waveform in an amplitude modulated communication.

FIGS. 3 and 4 represent sample amplitude modulated communications waveforms. Relevance to frequency modulated waveform would be similar. FIG. 3 is a graph of a clean waveform where ringing and distortion initially take place after the power part of a waveform cycle, these effects settle out and a clear indication of "1" or "0" can be made. FIG. 4 is a graph of a distorted waveform where there is not enough time for ringing and distortion to settle out before the next waveform cycle. Lengthening the cycle will allow those effects to attenuate and a proper voltage interpretation of "1" or "0" to take place. Given more time, the voltages would settle to the appropriate level for data signal interpretation.

Computer program code for carrying out operations of the invention described above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. It will be further appreciated that the functionality of any or all of the program modules may also be implemented using discrete hardware components, circuit boards, one or more application specific integrated circuits (ASICs), or a programmed digital signal processor or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The present invention can be configured for use in a computer or an information processing apparatus which includes a memory, such as a central processing unit (CPU), a RAM and a ROM as well as a storage medium such as a hard disc.

The "step-by-step process" for performing the claimed functions herein is a specific algorithm and is shown in the text of the specification as prose and/or in the flow charts. The instructions of the software program create a special purpose machine for carrying out the particular algorithm. In any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for digital network quality control for data transmitted between different devices in a communication system along a length of cable, comprising:
   generating a waveform by a waveform generator, the waveform comprising a carrier wave having a waveform shape defined by waveform criteria comprising one or more parameters, wherein the carrier wave is modulated to produce the waveform for data transfer;
   outputting the waveform to a data bus comprising a length of cable for transmission to a receiver adapted to extract data from the waveform;
   automatically tuning the waveform based on actual transmission conditions on the length of cable by modifying the waveform shape of the carrier wave by:
   (a) capturing the waveform from the data bus via a waveform capture device;
   (b) analyzing via a computing device the captured waveform by:
      (1) comparing the captured waveform to predetermined data transfer acceptance criteria for a clean waveform,
      (2) determining if the captured waveform fails to meet the data transfer acceptance criteria for a clean waveform based on distortions caused by the actual transmission conditions on the length of cable detected in the captured waveform, the distortions capable of interfering with proper interpretation of the data by the receiver,
      (3) wherein if the waveform fails to meet the data transfer acceptance criteria for a clean waveform, compiling factors to modify the one or more parameters of the waveform criteria for the carrier wave in order to meet the data transfer acceptance criteria; and (c) sending the factors back to the waveform generator;

(d) modifying the waveform shape of the carrier wave via the waveform generator by modifying the one or more parameters of the waveform criteria for the carrier wave, thereby providing a flexible waveform shape for the carrier wave rather than a constant waveform shape for the carrier wave.

2. The method of claim 1 wherein the factors comprise one or more of adjustments to pulse width, voltage levels, or carrier frequency for the waveform criteria for the carrier wave.

3. The method of claim 1 wherein the predetermined data transfer acceptance criteria are stored in memory associated with the computing device.

4. The method of claim 1 wherein the captured waveform is stored in memory associated with the computing device.

5. The method of claim 1 wherein the tuning of the waveform is activated periodically.

6. The method of claim 1 wherein the tuning of the waveform is activated in accordance with an error rate determination for data transmitted on the data bus.

7. The method of claim 1 wherein the data transmitted on the data bus is binary corresponding to a base-2 network.

8. The method of claim 1 wherein the data transmitted on the data bus corresponds to a base "n" network, wherein "n" represents the number of units of a number system.

9. The method of claim 1 further comprising determining if an error rate on the data bus exceeds a predetermined threshold prior to tuning of the waveform.

10. A tangible computer-readable media comprising instructions that when executed by a computer implement the steps of claim 1.

* * * * *